S. P. RUGGLES.
Fire-Place Blower.

No. 204,506. Patented June 4, 1878.

Witnesses
S. J. Masson
E. A. Dick

Inventor:
Stephen P. Ruggles
by E. E. Masson, atty

UNITED STATES PATENT OFFICE.

STEPHEN P. RUGGLES, OF BOSTON, MASSACHUSETTS, ASSIGNOR TO ELIZABETH THOMPSON, OF NEW YORK, N. Y.

IMPROVEMENT IN FIRE-PLACE BLOWERS.

Specification forming part of Letters Patent No. 204,506, dated June 4, 1878; application filed May 3, 1878.

*To all whom it may concern:*

Be it known that I, STEPHEN P. RUGGLES, of Boston, in the county of Suffolk and State of Massachusetts, have invented certain new and useful Improvements in Fire-Place Blowers; and that the following is a full, clear, and exact description of the same, reference being had to the accompanying drawings, making a part of this specification, in which—

Figure 1:
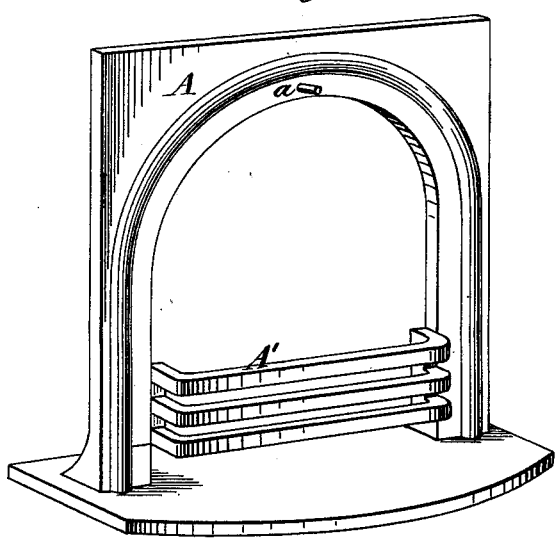
Figure 2:
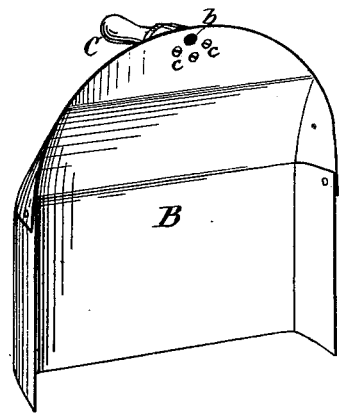
Figure 3:
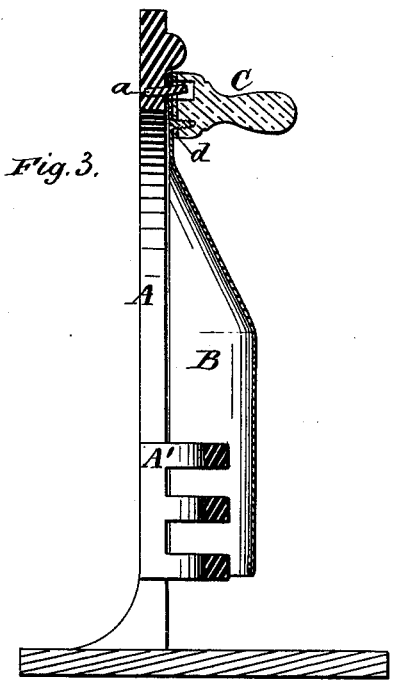

Figure 1 represents a perspective view of a fire-place to which my improved blower can be applied. Fig. 2 represents, in perspective, an inside view of the improved blower. Fig. 3 represents a central vertical section of the blower in position before a fire-place.

Fire-place blowers as generally constructed are made of sheet-iron, with a handle, also made of sheet-iron, placed about the center of the blower. They are retained in position before the grate by hooks engaging with it, or by simply standing the blower upon the top rail of the grate.

Cast-iron blowers used with portable open-fire stoves are often provided with ears on each side to rest upon projections formed upon the stove, or the blower is simply made to rest upon the top rail of the grate, and the handle is placed in the center of the blower. With the handle so placed, if the blower is cold, it can be grasped and placed in position before or above a grate, although generally not at the first attempt; but when the blower is hot this cannot be accomplished with the bare hand without danger, and if a pair of tongs or other similar means are used, the operation is often very trying to one's patience, and accidents are the result.

The object of my invention is to remedy these defects.

It consists in providing an ordinary blower for open-fire stoves or fire-places with a handle placed at the uppermost portion of the blower, where it will be subjected in the least to fire heat, and in making said handle of non-conducting material.

It also consists in a blower perforated centrally in its uppermost portion to receive a pin or hook, by which it is suspended in position, in combination with a handle made of non-conducting material, but perforated and located so as to coincide with the perforation of the blower, to receive and cover said pin or hook, substantially as will be described hereinafter.

In the drawings, A represents the front of an open-fire stove or fire-place, and A' the front grate. Centrally in the upper part of the frame A a pin or hook, a, is inserted, upon which the blower B can be suspended. For this purpose the latter is perforated at its uppermost portion, as shown at b.

To facilitate the operation of putting on and removing the blower while in use, I have attached to the uppermost portion of the outside of the blower a handle, C, by means of three screws, c, or otherwise. This handle is made of non-conducting material or substances, of which wood is probably the cheapest, and is hollow or perforated, so that, as it is placed in coincidence with the perforation b of the blower, it holds and conceals the pin or hook a, upon which it is suspended. A perforated washer, d, of non-conducting material, can also be interposed between the blower and handle.

The handle C being placed at the top of the blower, the center of gravity of the latter is so low that it will remain vertical while held by the handle, and as the pin a will be inserted directly into the handle, it will be found that in using a blower with my improved handle, and as located at the top, it can be readily put on and taken off without loss of time or danger.

This blower is represented as made of sheet-iron; but it is clear that it could be made of cast-iron, and the pin a inserted either in the top of the blower or in the frame of the fire-place, as may be desired.

Having thus fully described my invention, I claim—

1. In combination with a blower for open-fire stoves or fire-places, the handle and means for suspending said blower, located at the uppermost portion, substantially as and for the purpose described.

2. A blower perforated centrally in its uppermost portion to receive a pin or hook, by which it is suspended, in combination with a non-conducting handle perforated and located in coincidence with the perforation of the blower, to receive and cover said pin or hook, substantially as described.

STEPHEN P. RUGGLES.

Witnesses:
JOHN NEWELL,
E. E. MASSON.